(12) United States Patent
Al-Motairy et al.

(10) Patent No.: US 11,134,156 B1
(45) Date of Patent: Sep. 28, 2021

(54) SYSTEM AND METHOD FOR DETECTING AND ALERTING OF FLOODING IN TELECOMMUNICATIONS MANHOLES

(71) Applicant: SAUDI ARABIAN OIL COMPANY, Dhahran (SA)

(72) Inventors: Naji Nassir Al-Motairy, Abqaiq (SA); Badie Ali Guwaisem, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/836,712

(22) Filed: Mar. 31, 2020

(51) Int. Cl.
| | |
|---|---|
| *H04M 11/04* | (2006.01) |
| *G08B 21/18* | (2006.01) |
| *H04M 3/42* | (2006.01) |
| *H01H 35/18* | (2006.01) |

(52) U.S. Cl.
CPC ............ *H04M 11/04* (2013.01); *G08B 21/18* (2013.01); *H04M 3/42042* (2013.01); *H01H 35/18* (2013.01); *H04M 2242/18* (2013.01)

(58) Field of Classification Search
CPC combination set(s) only.
See application file for complete search history.

(56) References Cited

U.S. PATENT DOCUMENTS

| | | | |
|---|---|---|---|
| 5,283,569 | A | 2/1994 | Nelson |
| 7,002,481 | B1 | 2/2006 | Crane et al. |
| 7,417,552 | B1 | 8/2008 | Vaskovic |
| 2003/0140964 | A1* | 7/2003 | O'Donnell ............ F16K 24/042 137/202 |
| 2005/0034383 | A1 | 2/2005 | Allen |
| 2009/0303060 | A1 | 12/2009 | Almoumen |
| 2013/0121239 | A1* | 5/2013 | Hicks, III ............... H04W 4/12 370/328 |
| 2013/0243614 | A1 | 9/2013 | Moon et al. |
| 2014/0261770 | A1* | 9/2014 | Weed ....................... C02F 3/28 137/363 |
| 2018/0080661 | A1 | 3/2018 | Martire |

(Continued)

FOREIGN PATENT DOCUMENTS

| | | | |
|---|---|---|---|
| AU | 2004100596 A4 | 8/2004 | |
| CN | 102175405 A * | 9/2011 | ............. G01M 3/06 |
| CN | 204313923 U | 5/2015 | |

(Continued)

OTHER PUBLICATIONS

International Search Report issued in corresponding International Application No. PCT/US2020/030595, dated Nov. 13, 2020 (3 pages).

(Continued)

*Primary Examiner* — Phung-Hoang J Nguyen
(74) *Attorney, Agent, or Firm* — Osha Bergman Watanabe & Burton LLP

(57) ABSTRACT

A system for detecting water flooding in telecommunications manholes may include a float switch disposed at a predetermined flooding line in a telecommunications manhole. The float switch may be a switching device without a power source. The system may include an analog phone connected to the float switch through a telephone line connection associated with a pre-existing communication network. The analog phone may be configured for detecting a triggering signal from the float switch and initiating an alert procedure upon detecting the triggering signal.

18 Claims, 7 Drawing Sheets

(56) References Cited

U.S. PATENT DOCUMENTS

2018/0328597 A1* 11/2018 Martire ............... F24D 19/1009
2019/0353156 A1* 11/2019 Ward .................... F04B 23/021

FOREIGN PATENT DOCUMENTS

| CN | 109403380 A | 3/2019 |
|----|-------------|--------|
| EP | 1282093 A1 | 2/2003 |
| JP | 2010-138679 A | 6/2010 |
| JP | 4820807 B2 | 11/2011 |
| KR | 2010-0086182 A | 7/2010 |
| KR | 100992487 B1 | 11/2010 |
| KR | 2018-0042665 A | 4/2018 |
| WO | 2007100191 A1 | 9/2007 |

OTHER PUBLICATIONS

Written Opinion issued in corresponding International Application No. PCT/US2020/030595, dated Nov. 13, 2020 (6 pages).

* cited by examiner

SYSTEM AND METHOD FOR DETECTING AND ALERTING OF FLOODING IN TELECOMMUNICATIONS MANHOLES

FIELD

The disclosure relates generally to a system and a method for detecting and alerting of flooding in telecommunications manholes.

BACKGROUND

Telecommunication networks utilize cables buried underground to facilitate communications between different structures. These structures may be connected to one or more subterranean nodes of a telecommunication network. Since the cables are buried, manholes make it possible to have access at different distribution points along the cables for servicing, installation, upgrades, and maintenance. Service personnel may not easily detect flooding in a manhole. Although the manholes are properly sealed, liquids (such as water) may fill up the manhole from external sources such as rain, nearby water pipes, or rising sea tides. Flooding can have a severe impact on the integrity of telephone lines installed in the telecommunications network since copper wires may corrode and get shorted leading to long time interruptions and challenging maintenance work in the entire telecommunications network. Given the widespread of and the large quantity of these manholes, it is not feasible to add flood sensors to each manhole due to lack of a power source in most installations and the added cost for monitoring all manholes at once.

SUMMARY

In general, in one aspect, embodiments disclosed herein relate to a system for detecting water flooding in telecommunications manholes. The system includes a float switch disposed at a predetermined flooding line in a telecommunications manhole. The float switch is a switching device without a power source. The system includes an analog phone connected to the float switch through a telephone line connection associated with a pre-existing communication network. The analog phone is configured for detecting a triggering signal from the float switch and initiating an alert procedure upon detecting the triggering signal.

In general, in one aspect, embodiments disclosed herein relate to a method for installing a system for detecting water flooding in telecommunications manholes. The method includes disposing a float switch at a predetermined flooding line in a telecommunications manhole. The float switch is a switching device without a power source. The method includes connecting an analog phone to the float switch through a telephone line connection associated with a pre-existing communication network. The analog phone is configured for detecting a triggering signal from the float switch and initiating an alert procedure upon detecting the triggering signal.

In general, in one aspect, embodiments disclosed herein relate to a system for detecting water flooding. The system includes a float switch disposed at a predetermined flooding line in a telecommunications manhole. The float switch is a switching device without a power source. The system includes an analog phone connected to the float switch through a telephone line connection associated with a pre-existing communication network. The analog phone is configured for detecting a triggering signal from the float switch and initiating an alert procedure upon detecting the triggering signal.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
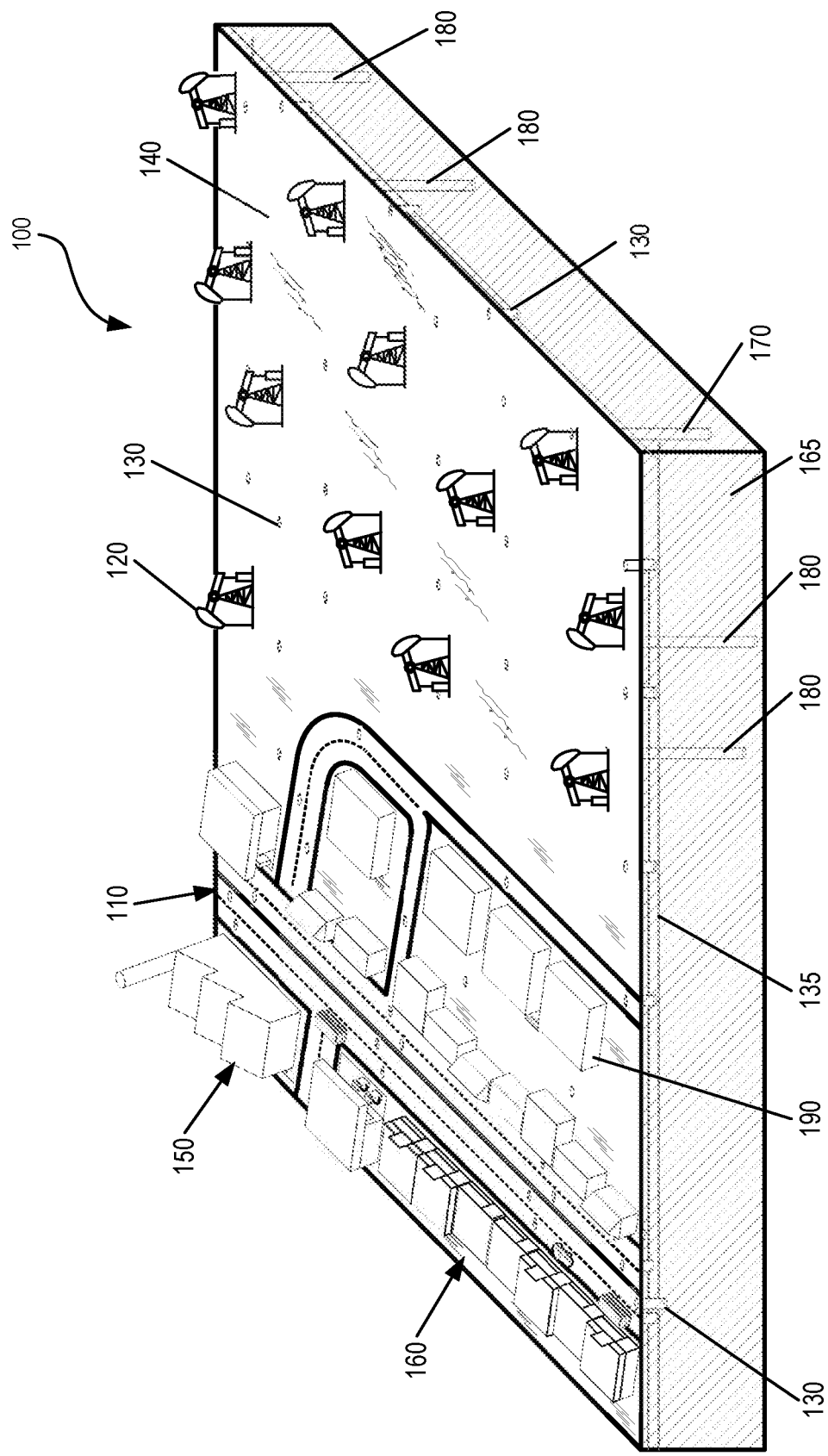
FIG. 1 shows a perspective view of a system for detecting flooding.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with the hydrocarbon production systems have not been shown or described in detail to avoid unnecessarily obscuring descriptions of the implementations and embodiments. For the sake of continuity, and in the interest of conciseness, same or similar reference characters may be used for same or similar objects in multiple figures.

In implementations described herein, a mechanism for detecting flooding in telecommunications manholes is connected to a pre-existing telecommunications network. Specifically, the mechanism may be integrated into a system for detecting flooding in telecommunications manholes located in an area covered by the pre-existing telecommunications network. In this case, the pre-existing telecommunications network may act as a medium to deliver flooding status information from the telecommunications manhole such that service personnel may be alerted of flooding based on one or more signals triggered by the mechanism for detecting flooding.

The mechanism may include a float switch acting as a handset connected to existing telephone lines in the pre-existing telecommunications network. To this point, the mechanism may use an electrical or a mechanical float switch connected to an analog phone through the telephone lines such that when water rises inside the telecommunications manhole, the float switch shorts the telephone line connection and triggers a simulated telephone call alerting of the flooding. As such, the mechanism allows immediate flooding detection without using sophisticated electrical sensors or requiring a power source in the telecommunications manhole. The mechanism also does not require its own communication network as copper wires arranged in a hotline connector may be used on existing telephone lines for triggering the analog phone.

In one or more embodiments, the invention includes configuring a phone switch to generate the simulated telephone call from a coded caller ID that indicates both the flooding alert and the location of the manhole. Specifically, service personnel may be alerted of the precise location of the flooding manhole without requiring to hear the automated call or even picking up the phone.

FIG. 1 illustrates an example of a pre-existing telecommunications network environment 100 including various manholes 130 extending from a surface area 140 into a subterranean area 165. The manholes 130 may be telecommunications manholes dispersed across different types of locations, such as roads 110, oil field locations 120, manufacturing locations 150, and commercial locations 160. The locations may use the pre-existing telecommunications network 135 for exchanging information. The pre-existing telecommunications network 135 may include pre-existing telephone lines (not shown separately) communicating between the surface area 140 and the subterranean area 165 such that the various telecommunications manholes 130 are spread in between these pre-existing telephone lines.

The pre-existing telecommunications network environment 100 may include various subterranean elements, such as various wells 180 that extend from surface area 140 into subterranean area 165. The pre-existing telecommunications network 135 may intercept the telecommunications manholes 130 while avoiding other subterranean elements, such as the wells 180. Because the telecommunications manholes 130 are dispersed throughout the entirety of the various locations, it may be advantageous to implement a system for detecting and alerting of flooding in any of the telecommunications manholes 130 at any given point. This system will be described in more detail with respect to FIG. 2.

Figure 2:
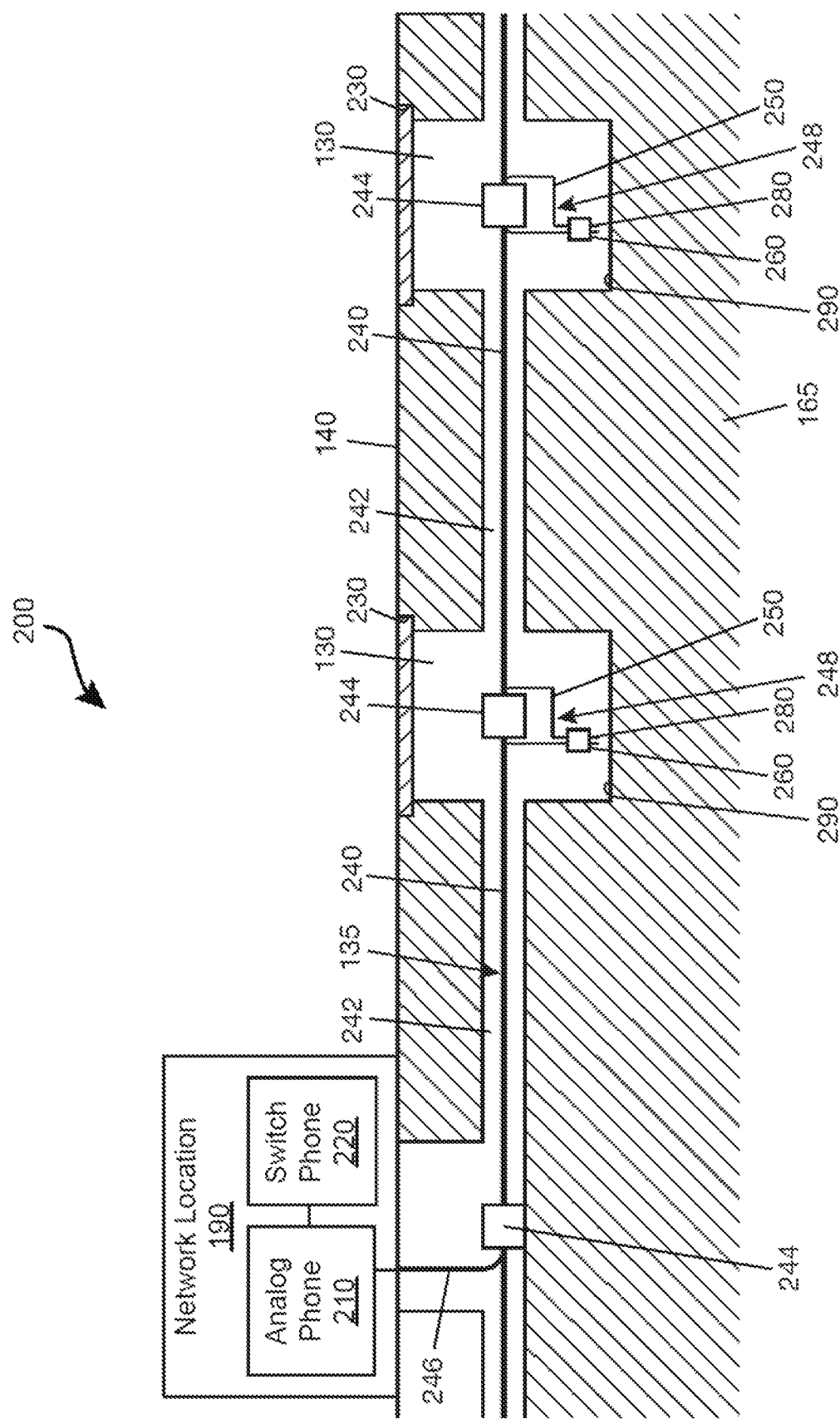
FIG. 2 shows a perspective view of a pre-existing telecommunications network including various manholes.

FIG. 2 shows a system 200 for detecting flooding in telecommunications manholes 130 according to one illustrative implementation. System 200 includes the pre-existing telecommunications network 135 extending through conduits 242 and telecommunication manholes 130 formed in subterranean area 165. In one example, pre-existing telecommunications network 135 includes pre-existing telephone lines 240, which are electrically coupled together by connectors 244. Each pre-existing telephone line 240 may be a bundle of electronic cables, such as copper cables and fiber optic cables, carried in a common jacket. In some cases, the fiber optic cables and copper cables may be carried in separate jackets. System 200 includes a network location 190 at the surface area 140 and above subterranean area 165. The network location is coupled to the telecommunications network 135, as shown at 246.

The telecommunications manholes 130 are accessible from surface area 140 through manhole entrance 230. The telecommunications manholes 130 may include various devices and equipment configured for providing telecommunications support. As an example, the connectors 244 between the pre-existing telephone lines 240 and portions of the pre-existing telephone lines 240 are shown inside the telecommunications manholes 130. In the event that the connectors 244 or pre-existing telephone lines 240 need to be serviced or repaired, service personnel can make such repairs by entering the telecommunication manholes 130 through manhole entrance 230.

System 200 includes a flood detector 248 disposed in each telecommunications manhole 130. Each flood detector 248 includes a float switch 260 and a hotline connection 250 made between the float switch 260 and the pre-existing telephone lines 240. The float switches 260 may include copper wires 280 that are exposed to the manhole environment. As a result, when the copper wires 280 come into contact with water due to flooding of the telecommunications manhole 130, the float switch 260 may be shorted.

As some telecommunications manholes 130 may be located in remote locations, and a number of telecommunications manholes 130 may be too large for any one individual to dedicate resources towards inspecting each telecommunications manhole 130 individually, the alerting means may be wired to alert servicing personnel of flooding in any one of the telecommunications manholes 130 immediately upon detecting flooding.

The hotline connections 250 may be an emergency response system or an automated calling system that plays a tune or a pre-recorded call in such a way that it informs a listener of the location of the manhole to be serviced. In the event of flooding, the manhole bottom 290 may be the first surface to be covered by flooding (like water). As such, as the flooding increases, different depths of the telecommunications manholes 130 may be flooded until reaching the pre-existing telephone lines 240 or other equipment inside the telecommunications manholes.

To detect the flooding, the float switches 260 may be placed at a predetermined depth from the manhole bottom 290 that allows for sufficient estimated time of arrival for servicing personnel to stop the flooding from increasing. As such, the predetermined depth may be different for each telecommunications manhole 130. Further, the predetermined depth may depend on immediate locations surrounding a specific manhole entrance 230. Specifically, in the event that a manhole entrance 230 is breached and rain water starts to fall in, the alerting means associated with that specific telecommunications manhole 130 may trigger a signal alerting servicing personnel of the flooding and including an exact location of the flooded telecommunications manhole 130. Based on the location of the telecommunications manhole 130 and the known predetermined depth at which the flooding signal is triggered, servicing personnel may know an average reaction time and average resources needed to stop the flooding and prevent future flooding from occurring at the specific location.

In one or more embodiments, the float switch 260 transmits a signal to a connection in the pre-existing telephone lines 240. Further, the float switch 260 may include copper wires 280 arranged at the predetermined depth such that flooding may shorten the open copper wires connection. Based on the location of the telecommunications manhole 130, the pre-existing telephone lines 240 may carry a trigger signal upon shortening of the copper wires 280. The hotline connections 250 may be coupled through a connector to the pre-existing telephone lines 240 and may allow the trigger signal to travel from the location of the telecommunications manhole 130 experiencing flooding to an analog phone 210 and a switch phone 220 located at the network location 190.

In addition, because the alerting means are wires that react to the flooding in a telecommunications manhole 130, the alerting means do not need a power supply disposed anywhere near the telecommunications manhole 130. Further, because the alerting means are coupled directly to pre-existing telephone lines 240 of the pre-existing telecommunications network 135, the alerting means do not need any electronic communication devices or mechanical relays, besides the hotline and the connector, to be disposed near the telecommunications manhole 130. As such, standalone alerting means may be quickly installed in a telecommunications manhole 130 without requiring advanced configurations or installations.

As it will be explained in reference to FIGS. 2, 6, and 7, the analog phone 210 may be in further communication with the switch phone 220 that interprets the trigger signal and generates calls and/or messages indicating the exact location of the flooding telecommunications manhole 130. In some embodiments, there may be more than one analog phone 210 to which trigger signals may be transmitted. Specifically, an analog phone 210 may receive trigger signals from various telecommunications manholes 130 within a specific area.

Figure 3:
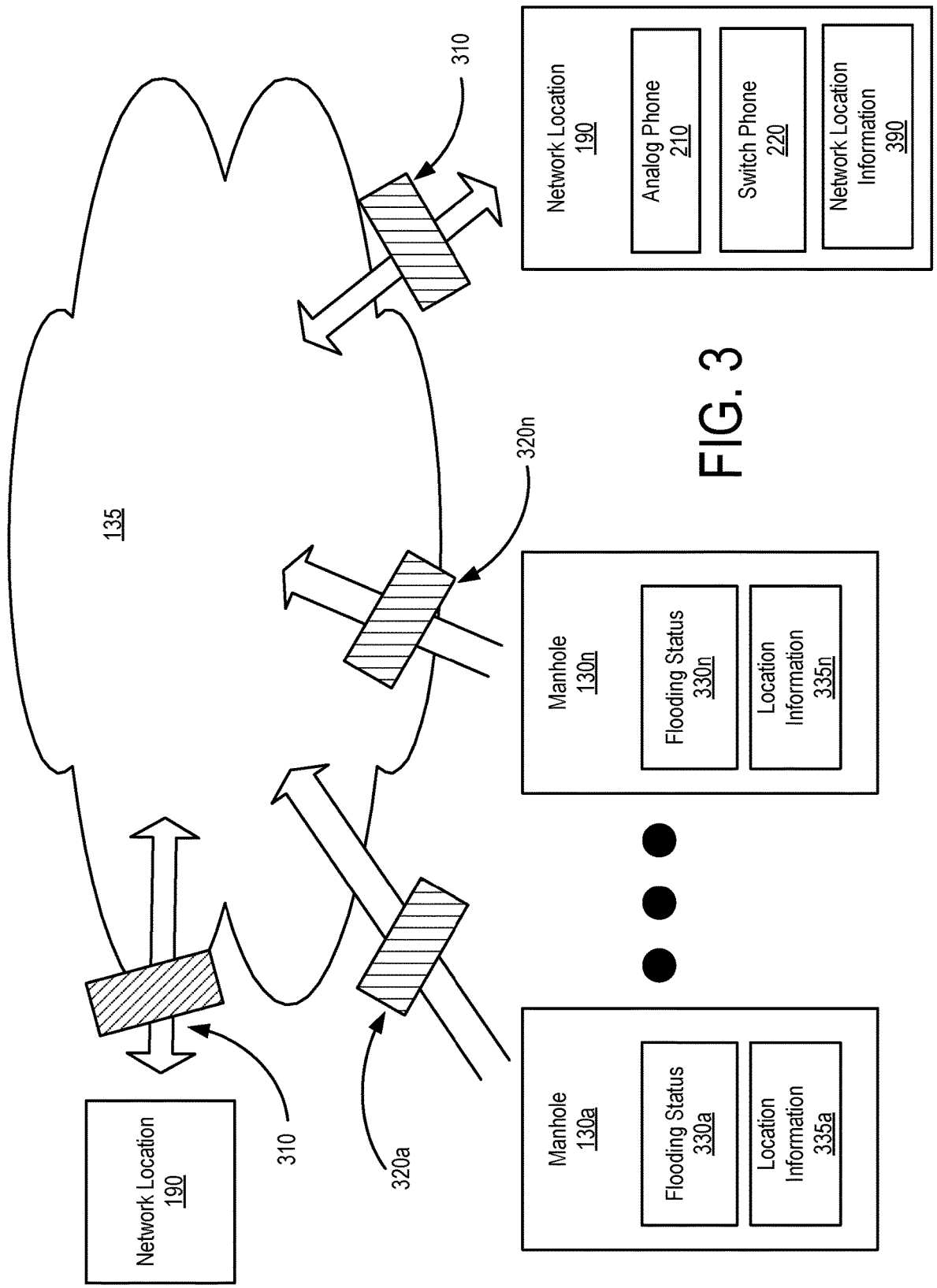
FIG. 3 shows an example of integration of manhole status notification and alert in a pre-existing telecommunications network.

In one or more embodiments, FIG. 3 shows various communications (for example, network location communications 310 and manhole communication 320a through manhole communication 330n) distributed towards a pre-existing telecommunications network 135. The pre-existing telecommunications network 135 may be the pre-existing telecommunications network 135 as described with respect to FIGS. 1 and 2. The pre-existing telecommunications network 135 may include the various communications to/from various network locations 190 as described in FIGS. 1 and 2.

Further, the pre-existing telecommunications network 135 may include the various communications from various telecommunications manholes 130 as described in FIGS. 1 and 2. As described in FIGS. 1 and 2, the various manholes may transmit trigger signals into the pre-existing telecommunications network 135 such that flooding statuses (for example, flooding status 330a through flooding status 330n) and various location information (for example, location information 335a through location information 335n) may be transmitted through their respective communications. The pre-existing telecommunications network 135 may transport the communications from the telecommunications manholes 130 as trigger signals for one or more analog phones 210.

Figure 4:
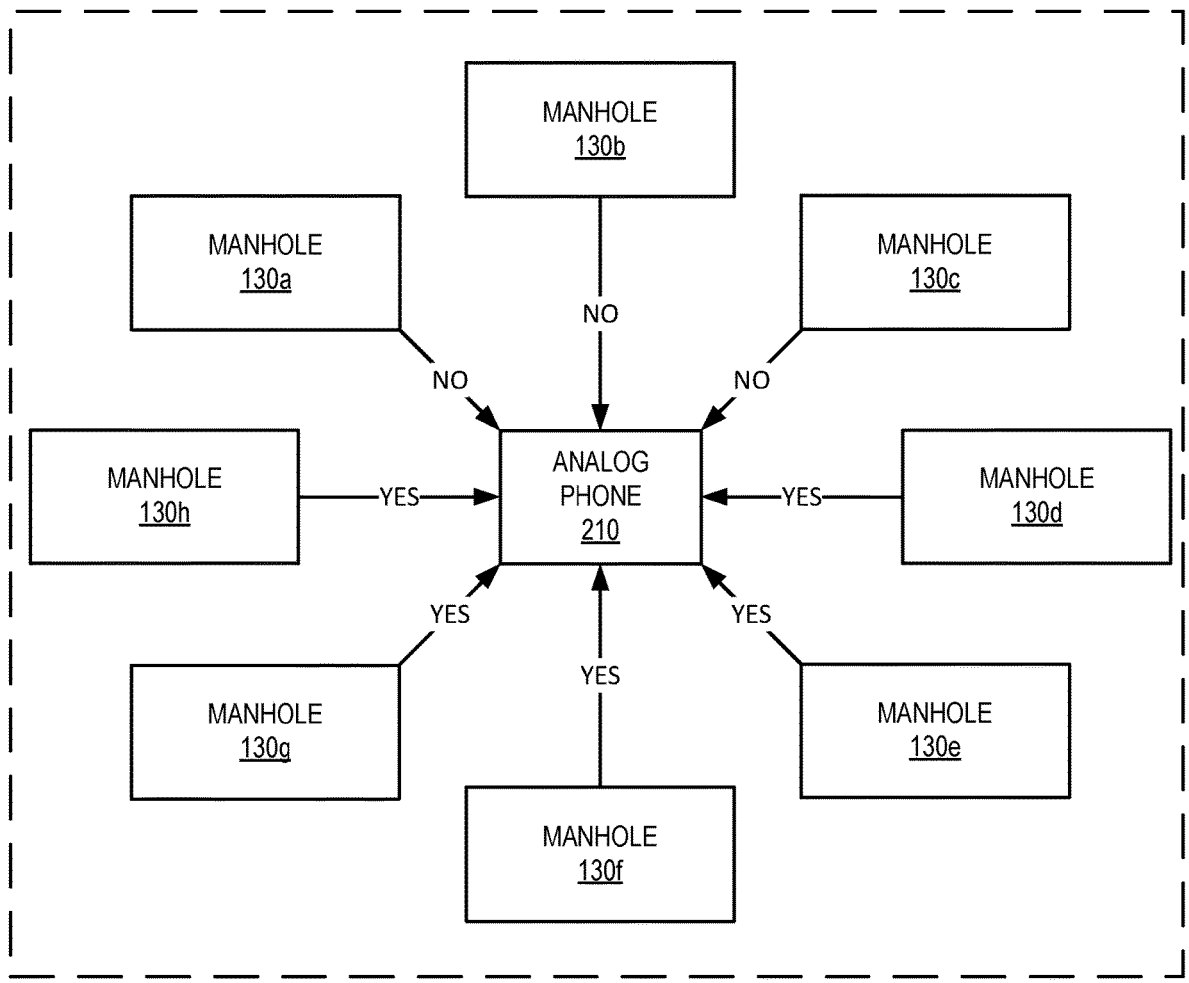
FIG. 4 shows an example of requesting servicing a manhole in a pre-existing telecommunications network.

FIG. 4 shows an example for explanatory purposes only and not intended to limit the scope of the disclosed technology. Specifically, in FIG. 4, a request to service manhole 400 may be incorporated in a pre-existing telecommunications network 135 to include various telecommunications manholes 130 (for example, manhole 130a through manhole 130h). Here, the telecommunications manholes 130 have been coupled to the pre-existing telecommunications network 135 in such a way that each of the manholes reports a flooding status to an analog phone 210. As such, the analog phone 210 may be informed of the flooding status of any manhole surrounding the analog phone 210 and connected over the pre-existing telecommunications network 135. In FIG. 4, the "YES" and the "NO" instructions may be triggering signals and the lack of triggering signals, respectively. Upon one of the manholes reporting a flooding status through the triggering signals, the analog phone 210 may determine that there is flooding in the pre-existing telecommunications network 135.

Figure 5:
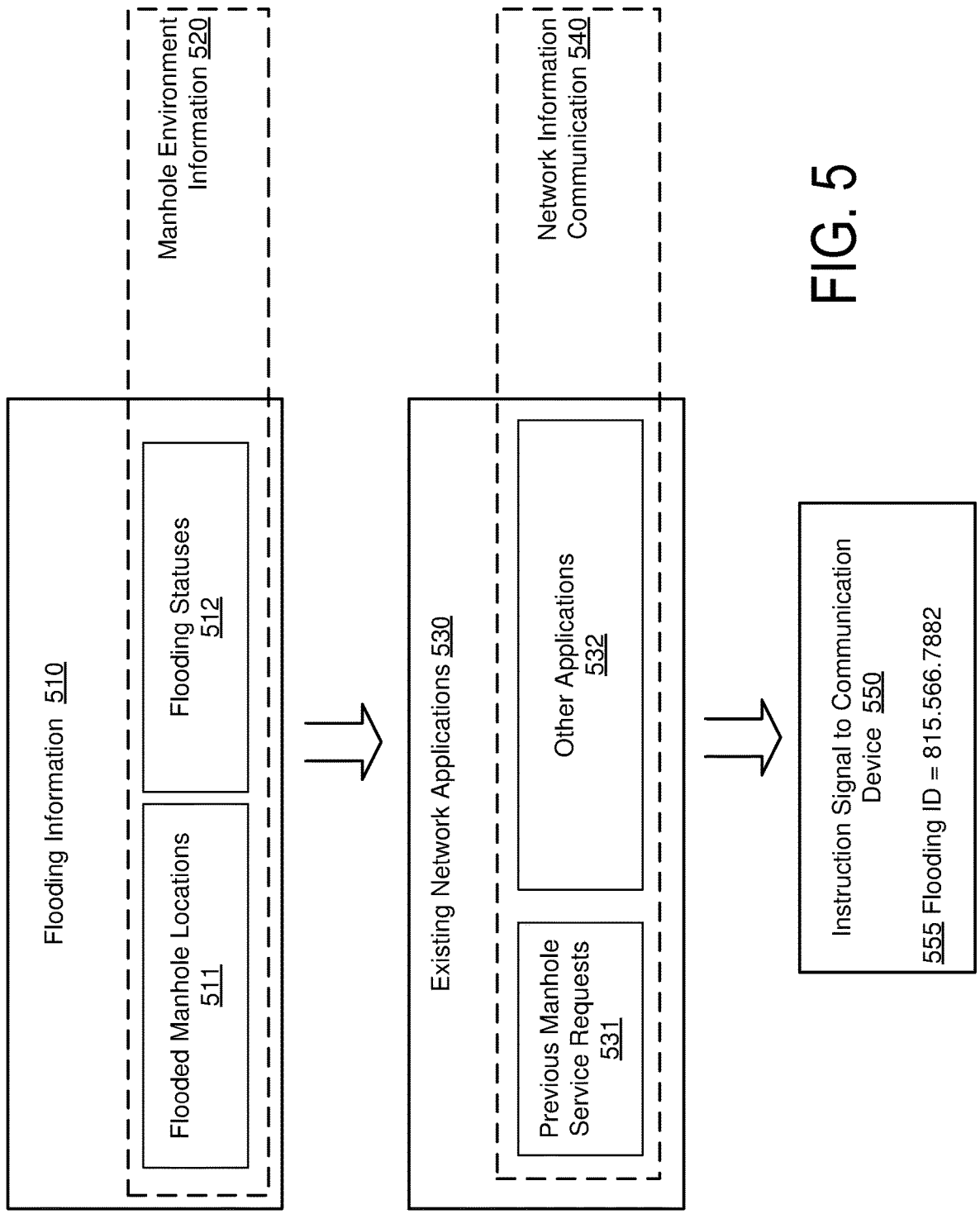
FIG. 5 shows an example of generating a flooding ID.

FIG. 5 shows an example of generating a flooding ID based on the aggregated data from FIG. 4. Specifically, flooding information 510 aggregated in the manner introduced in FIG. 4 is collected for flooded manhole locations 511 and the flooding statuses associated to each manhole location. The flooding information 510 is then developed into manhole environment information 520. The manhole environment information 520 may include mapping information of flooding manholes in a specific location as described in FIGS. 1 and 2.

Further, the manhole environmental information may be relayed to a phone switch, which may implement one or more existing network applications. For example, an existing network application 530 may include previous manhole service requests 531 in the manner described with respect to FIG. 4 and other applications 532. These applications may be condensed by the phone switch 220 into network information communication 540 such that a value is assigned to each parameter in the manhole environment information 520. Upon processing of the network information communication 540, an instruction signal to a communication device 550 may be generated such that communication devices may receive a coded version of the manhole environmental information 520. For example, the coded version may be in the form of a flooding ID 555 which incorporates the location of flooding manholes in a calling number.

In one or more embodiments, this flooding ID 555 may have an initial area code representative of a location of the flooded manholes. Further, each of the following numbers may be a manhole location in a pre-determined row or column delimiting an area. Specifically, while a coded version may have various numbers of a same value, these numbers may represent different locations based on their proximity to the area code. Other coding techniques may be implemented such that a string of 10 numbers may be decoded into the flooded manhole locations 511.

Thanks to the Flooding ID 555, if an existing telecommunications manhole 130 where to require servicing, the alerting means for this telecommunications manhole 130 may generate a trigger signal indicating an exact location in the pre-existing telecommunications network 135. If a new telecommunications manhole 130 where to be installed, alerting means may be added for the new telecommunications manhole 130. Upon installing new alerting means, an analog phone 210 would need to be configured to interpret a triggering signal from the new alerting means installed. As such, based on location, the analog phone 210 may instantaneously indicate to a phone switch 220 that the telecommunications manhole 130 requiring servicing is a newly dug manhole or a newly acquired manhole through the flooding ID 555. In this case, the number of telecommunications manhole 130 requiring servicing does not matter because the flooding ID 555 includes information relating to the level of flooding in an area (i.e., based on the location information). As such, a unique flooding ID 555 may be provided for each telecommunications manhole 130 requiring servicing.

Figure 6:
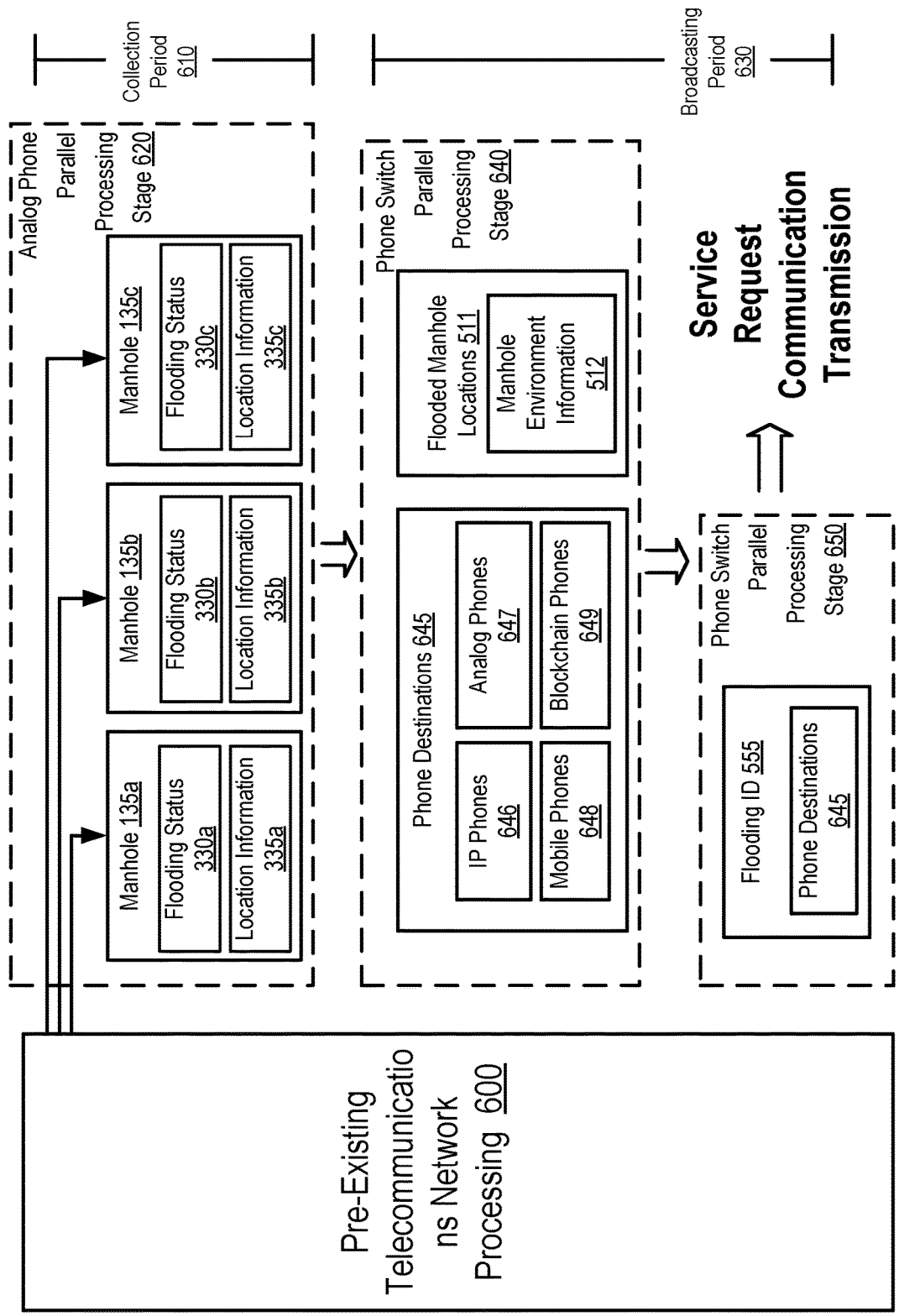
FIG. 6 shows an example of generating a service request transmission.

FIG. 6 shows an example of generating a service request transmission.

Specifically, a process of alerting detected flooding in telecommunications manholes 130 may be divided into various parallel processing stages (for example, analog phone parallel processing stage 620, phone switch parallel processing stage 640, and phone switch parallel processing stage 650). In particular, a parallel processing stage may include multiples simulation processes that are performed simultaneously using different processing techniques. For example, in the analog phone parallel processing stage 620, information may be transported through pre-existing telecommunications network processing 600 from various manholes simultaneously as the service request communication transmission is repeated in a given time period. The pre-existing telecommunications network processing 600 may use transporting means such as the copper wires 280 in which information relating the telecommunications manhole 130 are exchanged. For example, information relating to manhole 130a, manhole 130b, and manhole 130c may be communicated to analog phone 210. In this case, the analog phone 210 may receive triggering signals from any of the manholes. The analog phone 210 may extrapolate manhole location information (for example, location information 330a, location information 330b, and location information 330c) and flooding status (for example, flooding status 330a, flooding status 330b, and flooding status 330c) from each triggering signal received.

As shown in FIG. 6, after completing the analog phone parallel processing stage 620, the process of alerting detected flooding proceeds to the phone switch parallel processing stage 640, and finally to the phone switch parallel processing stage 650 to complete the process of alerting.

In regard to the phone switch parallel processing stage 640, the phone switch 220 may determine or identify phone destinations 645 for transmitting information relating to the various telecommunications manholes 130. Specifically, these locations may be include IP phones 646, analog phones 647, mobile phones 648, and/or blockchain phones 649. Further, the information relating to the various manholes may include flooded manhole information 511 including manhole environment information 512 as related by the process of alerting detected flooding. Further, in regard to the phone switch parallel processing stage 650, the phone switch may determine or identify a flooding ID 555 for each of the phone destinations 645. A service request communication transmission may be generated such that servicing personnel equipped with one or more of the phone destinations 645 may be alerted.

In some embodiments, a reservoir simulation is divided into one or more obtaining periods (for example, collection period 610) and/or one or more releasing periods (for example, broadcasting period 630). In the obtaining periods, information is collected by the various alerting means from each manhole and this information is relayed by their associated analog phone. In the releasing periods, processed information may be delivered to one or more destination locations such that the analog phone can deliver servicing request to appropriate communication devices.

Figure 7:
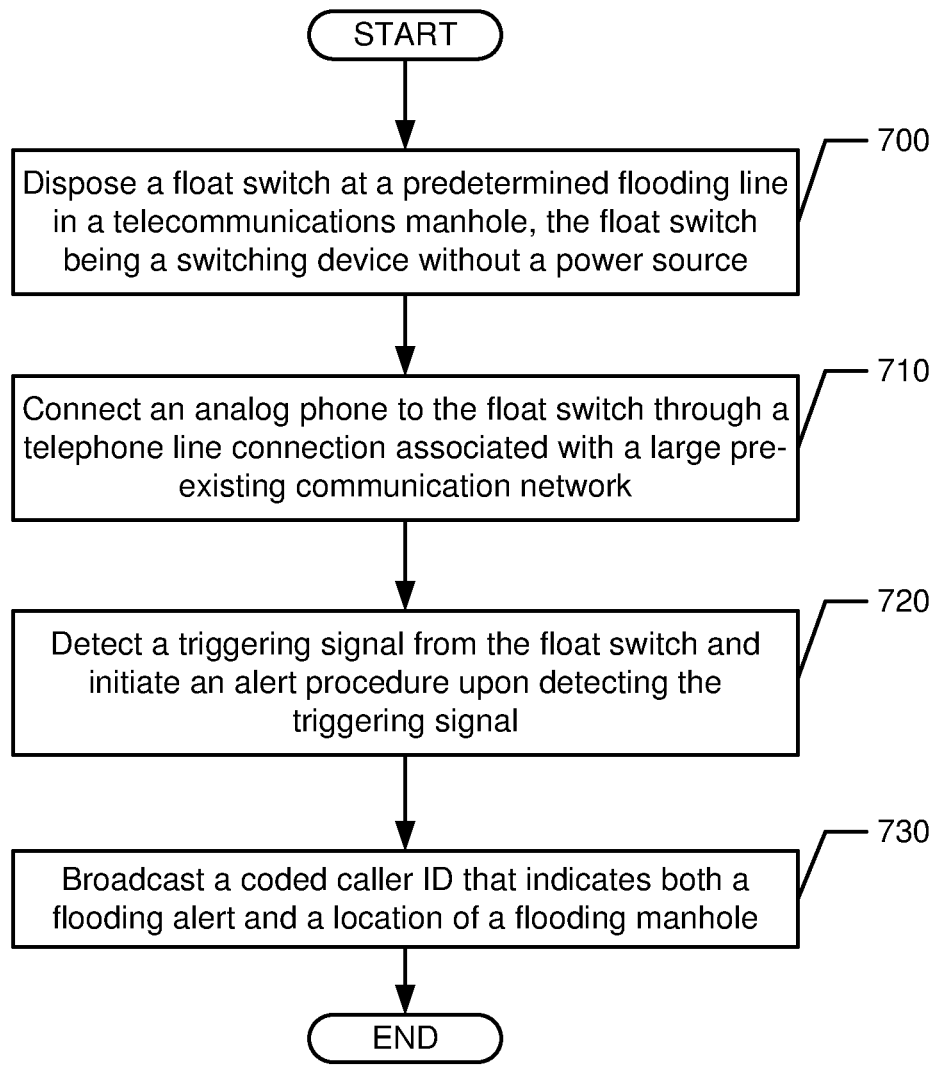
FIG. 7 shows a flowchart in accordance with one or more embodiments.

FIG. 7 shows a flowchart describing a method for installing a system for detecting water flooding in telecommunications manholes. One or more blocks in FIG. 7 may be performed by one or more components as described above in FIGS. 1-6 (for example, the various alerting means). While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

At 700, a float switch is disposed at a predetermined flooding line in a telecommunications manhole, the float switch being a switching device without a power source in accordance to one or more embodiments. Specifically, the float switch may be copper wires taken from a pre-existing telecommunications network for detecting flooding in a telecommunications manhole.

At 710, an analog phone is connected to the float switch through a telephone line connection associated with a pre-existing communication network. specifically, the communication network may be a telecommunications network installed in a determined area for supplying telephone lines to one or more network locations 190.

At 720, a triggering signal is detected from the float switch and initiate an alert procedure upon detecting the triggering signal. Specifically, the analog phone may be configured to trigger a location identification information based on the triggering signal received.

At 730, a coded caller ID is broadcasted indicating both a flooding alert and a location of a flooding manhole. Specifically, flooding IDs may be associated to each transmission broadcasted such that each flooding manhole incorporates the obtained information.

While the invention has been described with respect to a limited number of embodiments, those skilled in the art, having the benefit of this disclosure, will appreciate that other embodiments can be devised that do not depart from the scope of the invention as described herein. Accordingly, the scope of the invention should be limited only by the accompanying claims.

What is claimed is:

1. A system for detecting water flooding in telecommunications manholes, comprising:
   an analog phone connected to a pre-existing communication network; and
   a float switch disposed at a predetermined flooding line in a telecommunications manhole,
     the float switch being connected to adjust a telephone line connection to transmit a triggering signal to the pre-existing communication network when a liquid level in the telecommunications manhole rises to the predetermined flooding line, and
     the float switch being a switching device that is not powered by an external power source,
   wherein the analog phone is configured to detect the triggering signal from the pre-existing communication network and initiate an alert procedure upon detecting the triggering signal, and
   wherein, in the alert procedure, the analog phone causes the triggering signal to be divided into a plurality of parallel processing stages, the plurality of parallel processing stages being configured to use different processing techniques to indicate a flooding alert simultaneously in a given time period.

2. The system of claim 1, wherein the float switch is a pair of copper wires coupled to a hotline connector.

3. The system of claim 1, further comprising: a phone switch connected to the analog phone, wherein the analog phone initiates the alert procedure by instructing the phone switch to send alert signals to at least one communication device or system.

4. The system of claim 1, further comprising: a phone switch connected to the analog phone, wherein the phone switch is configured to generate a simulated telephone call to a plurality of predefined telephone numbers upon initiation of the alert procedure.

5. The system of claim 4, wherein the simulated telephone call includes a coded caller ID that indicates both the flooding alert and a location of the manhole.

6. A method for installing a system for detecting water flooding in telecommunications manholes, comprising:
   connecting an analog phone to a pre-existing communication network,
   disposing a float switch at a predetermined flooding line in a telecommunications manhole,
      the float switch being connected to adjust a telephone line connection to transmit a triggering signal to the pre-existing communication network when a liquid level in the telecommunications manhole rises to the predetermined flooding line, and
      the float switch being a switching device that is not powered by an external power source,
   wherein the analog phone is configured to detect the triggering signal from the pre-existing communication network and to initiate an alert procedure upon detecting the triggering signal, and
   wherein, in the alert procedure, the analog phone causes the triggering signal to be divided into a plurality of parallel processing stages, the plurality of parallel processing stages being configured to use different processing techniques to indicate a flooding alert simultaneously in a given time period.

7. The method of claim 6, wherein the float switch is a pair of copper wires coupled to a hotline connector.

8. The method of claim 6, further comprising: connecting a phone switch to the analog phone, wherein the analog phone initiates the alert procedure by instructing the phone switch to send alert signals to at least one communication device or system.

9. The method of claim 6, further comprising: connecting a phone switch to the analog phone, wherein the phone switch is configured to generate a simulated telephone call to a plurality of predefined telephone numbers upon initiation of the alert procedure.

10. The method of claim 9, wherein the simulated telephone call includes a coded caller ID that indicates both the flooding alert and a location of the manhole.

11. A system for detecting water flooding, comprising: an analog phone connected to a pre-existing communication network; and a float switch disposed at a predetermined flooding line in a telecommunications manhole, the float switch being connected to the pre-existing communication network via a telephone line connection, the float switch being connected to adjust the telephone line connection to transmit a triggering signal to the pre-existing communication network when a liquid level in the telecommunications manhole rises to the predetermined flooding line, and the float switch being a switching device that is not powered by an external power source, wherein the analog phone is configured to detect the triggering signal from the pre-existing communication network and to initiate an alert procedure upon detecting the triggering signal, and wherein, in the alert procedure, the analog phone causes the triggering signal to be divided into a plurality of parallel processing stages, the plurality of parallel processing stages being configured to use different processing techniques to indicate a flooding alert simultaneously in a given time period.

12. The system of claim 11, wherein the float switch is a pair of copper wires coupled to a hotline connector.

13. The system of claim 12, further comprising: a phone switch connected to the analog phone, wherein the analog phone initiates the alert procedure by instructing the phone switch to send alert signals to at least one communication device or system.

14. The system of claim 12, further comprising: a phone switch connected to the analog phone, herein the phone switch is configured to generate a simulated telephone call to a plurality of predefined telephone numbers upon initiation of the alert procedure.

15. The system of claim 14, wherein the simulated telephone call includes a coded caller ID that indicates both the flooding alert and a location of the flooding alert.

16. The system of claim 1, wherein the float switch is connected to short the telephone line connection to transmit the triggering signal to the pre-existing communication network when the liquid level in the manhole rises to the predetermined flooding line.

17. The system of claim 1, wherein the float switch is connected to the pre-existing communication network via the telephone line connection.

18. The method of claim 6, wherein the float switch is connected to the pre-existing communication network via the telephone line connection.

* * * * *